United States Patent [19]

Sarr et al.

[11] Patent Number: 5,051,933
[45] Date of Patent: Sep. 24, 1991

[54] METHOD AND APPARATUS FOR MEASURING THE WAVINESS OF AN AERODYNAMIC SURFACE

[75] Inventors: Dennis P. Sarr, Kent; Joey J. H. Mullen, Seattle, both of Wash.

[73] Assignee: The Boeing Company, Seattle, Wash.

[21] Appl. No.: 196,502

[22] Filed: May 20, 1988

[51] Int. Cl.⁵ .............................................. G01B 5/28
[52] U.S. Cl. .................. 364/551.01; 73/105; 33/536
[58] Field of Search ............. 364/550, 551.01, 507, 364/508, 560, 551.02; 33/521, 517, 533, 534, 536; 73/104, 105

[56] References Cited

U.S. PATENT DOCUMENTS

| | | | |
|---|---|---|---|
| 2,977,533 | 3/1961 | Savage | 324/71.1 |
| 3,056,209 | 10/1962 | Oliver | 33/523 |
| 3,161,961 | 12/1964 | Lyna et al. | 33/533 |
| 3,470,739 | 10/1969 | Takafuji et al. | 73/159 |
| 4,084,324 | 4/1978 | Whitehouse | 33/504 |
| 4,103,542 | 8/1978 | Wheeler et al. | 73/105 |
| 4,158,258 | 6/1979 | McKechnie | 33/521 |
| 4,166,291 | 8/1979 | Shupe | 364/560 |
| 4,184,263 | 1/1980 | Tatsumi et al. | 364/560 X |
| 4,417,466 | 11/1983 | Panetti | 73/105 |
| 4,422,322 | 12/1983 | Spangler | 73/105 |
| 4,434,558 | 3/1984 | Face, Jr. et al. | 33/533 |
| 4,693,012 | 9/1987 | Cesna | 33/533 |
| 4,771,549 | 9/1988 | Shelangoskie et al. | 33/533 |
| 4,811,253 | 3/1989 | Johns | 364/560 |
| 4,888,983 | 12/1989 | Dunfield et al. | 73/104 |

Primary Examiner—Joseph L. Dixon
Attorney, Agent, or Firm—Seed and Berry

[57] ABSTRACT

Method and apparatus for measuring the waviness of an aerodynamic surface includes a sensing unit that provides a plurality of data values which indicate the vertical deflection of a sensor at predetermined positions along the surface. A microprocessor receives the plurality of data values and processes the values in accordance with a method to determine the waviness of the surface. The microprocessor determines which of the plurality of data points have a convex curvature with respect to the data points to which it is adjacent and uses the convex data points to define lines which are tangent to the surface. The tangent lines are used to identify waves in the surface. The depth and length of each wave is determined from the tangent lines and the waviness calculation performed in accordance with a predetermined waviness formula.

18 Claims, 6 Drawing Sheets

METHOD AND APPARATUS FOR MEASURING THE WAVINESS OF AN AERODYNAMIC SURFACE

DESCRIPTION

1. Technical Field

The present invention is directed toward waviness measurement apparatus and method and, more particularly, toward method and apparatus for electronic measurement of the waviness of an aerodynamic surface.

2. Background of the Invention

Determining the waviness of surfaces is a measurement which is useful in many applications. In the aircraft industry, for example, the waviness measurement of aerodynamic surfaces provides an indication of the performance of the surface in flight. Aerodynamic surfaces are required to meet strict tolerances to ensure adequate performance of the aircraft. Therefore, the waviness measurement is sued to control the quality of aerodynamic surfaces.

Prior apparatus for measuring the waviness of surfaces required manual measurement using a "spline" to find the waves and a feeler gauge to determine the wave's depth. This method is time consuming and inaccurate. Various other methods for measuring the waviness of a surface require apparatus which is particularly suited for use on a particular surface. These methods lack the versatility to provide widespread acceptance.

It is therefore desirable to provide method and apparatus for determining the waviness of a surface which is fast and accurate. It is also desirable t provide method and apparatus for measuring the waviness of a surface which can be used on a variety of surfaces.

SUMMARY OF THE INVENTION

The present invention comprises method and apparatus for measuring the waviness of surfaces using an electronic processor to ensure accuracy of the measurement. In accordance with the present method, the surface to be measured is gauged at a plurality of points to provide a plurality of samples wherein each sample indicates the vertical deflection of the surface at the point where the sample is taken. A data processor processes the plurality of samples to identify a plurality of surface waves. The waviness of the surface is characterized from the plurality of samples in accordance with a predetermined waviness calculation.

In accordance with a particularly novel method for identifying the waves on the surface, a tangent line segment is first defined wherein the end points of the tangent line segment are the points of tangency and wherein the wave is defined by the surface intermediate the end points of each tangent line segment. The tangent line segments are identified by defining a line between two convex data points and determining whether selected data points intermediate the convex data points are above the line, if not, the line is considered tangent to the surface.

Further, in accordance with another novel aspect of the invention a convex data point is defined as a data point which has a convex curvature with respect to the two data points to which it is adjacent. The convex data points are defined by determining whether the distance from a subject data point to a line which intersects the two data points to which the subject data point is adjacent is positive.

DETAILED DESCRIPTION OF THE DRAWINGS

Figure 1:
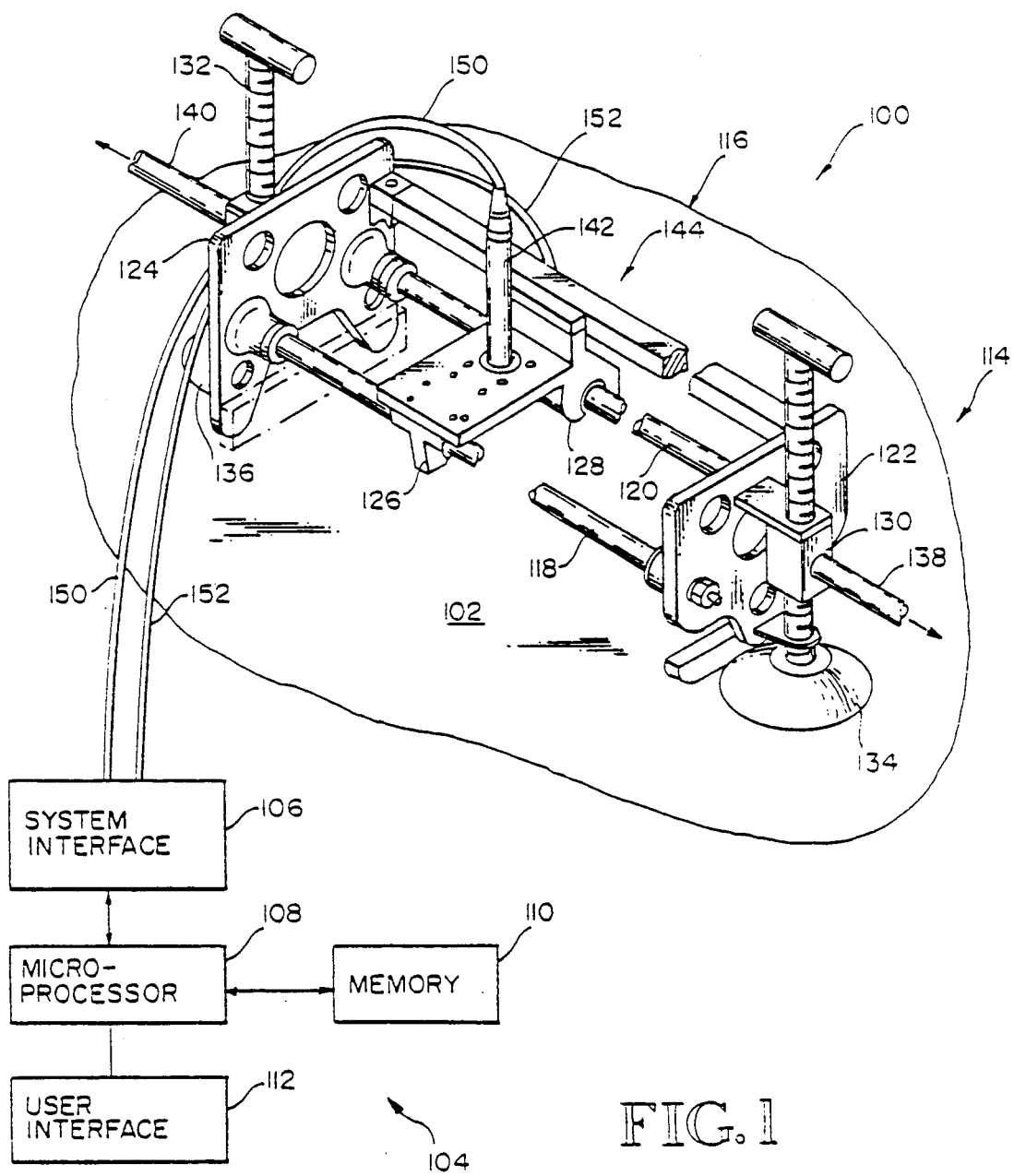
FIG. 1 is a schematic illustration of the apparatus for determining the waviness of a surface which is the subject of the present invention.

Apparatus for measuring the waviness of a surface is illustrated in FIG. 1. A sensing unit 100 is secured to a surface 102 the waviness of which is to be measured. The sensing unit 100 is coupled to a data processing unit 104 for providing a plurality of data samples to the data processing unit.

The data processing unit 104 comprises a system interface 106 for receiving the data samples from the sensing unit 100 and providing the data samples to a microprocessor 108. The interface 106 may comprise a plurality of devices for adapting the data signals provided from the sensing unit 100 for use by the microprocessor 108. Additionally, the interface 106 may comprise apparatus for facilitating exchange of data between the microprocessor 108 and the sensing unit 100. As an example, the interface 106 may comprise latches, timing circuitry, buffers and various other circuitry for interfacing the sensing unit 100 with the microprocessor 108.

The microprocessor 108 is coupled to a memory circuit 110 for storing the data samples received from the sensing unit 100. Further, the memory circuit 110 may be used for storing program data which controls the operation of the microprocessor 108. The memory circuit 110 may include random access memory (RAM), read only memory (ROM) and interface circuitry for interfacing the memory with the microprocessor 108.

The microprocessor 108 is also coupled to a user interface 112 for interfacing a user with the microprocessor 108. The user interface may comprise a keyboard, a data display, a printer or any combination of the foregoing devices. Further, the user interface may comprise a plurality of switches or other devices for interfacing a user with the microprocessor 112.

It will be apparent to those skilled in the art that although the data processing unit 104 is described herein as a combination of discrete devices, it may actually comprise an integral device such as one of the many personal computers currently available in the marketplace. In the presently preferred embodiment of the invention, the data processing unit 104 comprises a Compaq Portable 286 personal computer. It will also be apparent to those skilled in the art that the data processing unit 104 may comprise a device developed solely for use with the sensing unit 100 of the present invention.

The sensing unit 100 comprises a frame 114 upon which a carriage assembly 116 is slidably mounted. The frame 114 includes first and second guide bars 118 and 120, respectively, which are supported on either end by first and second frame supports 122 and 124. Each frame support 122 and 124 is fixedly attached to first and second suction handles 130 and 132, respectively. The suction handles 130 and 132 each include a respective suction cup 134 and 136 for securing the frame 114 to the surface 102. The suction handles 130 and 132 further include respective vacuum hoses 138 and 140 for creating a vacuum within the suction cups 134 and 136 to thereby ensure adhesion to the surface 102.

The carriage assembly 116 is supported upon the guide bars 118 and 120 by bearing support units 126 and 128 to allow the carriage assembly 116 to move freely over the guide rails. The carriage assembly 116 includes a first sensor 142 for sensing the vertical deflection of the surface 102. The carriage assembly 116 further includes a second sensor 144 for sensing the distance of travel of the carriage assembly 116. In the presently preferred embodiment of the invention, both sensors 142 and 144 comprise Sony Magnascale units which are readily available in the marketplace.

The sensors 142 and 144 are each coupled to the system interface 106 via first and second cables 150 and 152, respectively. The sensors 142 and 144 continuously provide data signals to the system interface 106, wherein the data signals represent the displacement of the sensor from a reference position. The system interface also provides data to the sensors 142 and 144 to reset the sensors and thereby define the reference position.

Figure 2:
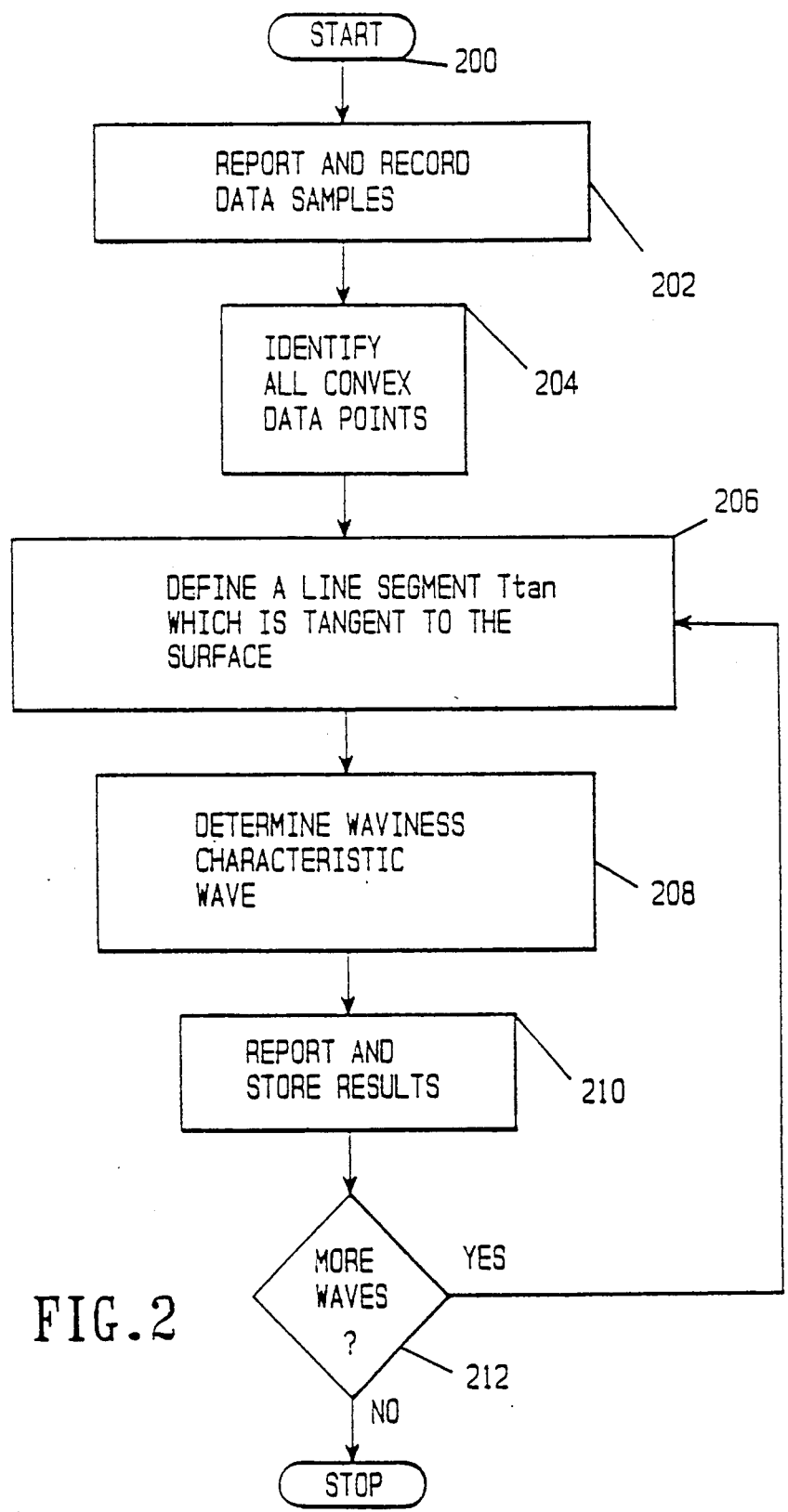
FIG. 2 is a decision flow diagram illustrating the method of the present invention for determining the waviness of the surface.

In accordance with the method which comprises the present invention, a plurality of data samples are received by the microprocessor 108 from the sensors 142 and 144 via the system interface 106, step 202 (FIG. 2). The data samples are used to identify a plurality of waves on the surface 102 and thereby determine the waviness characteristics of the surface.

Figure 3:
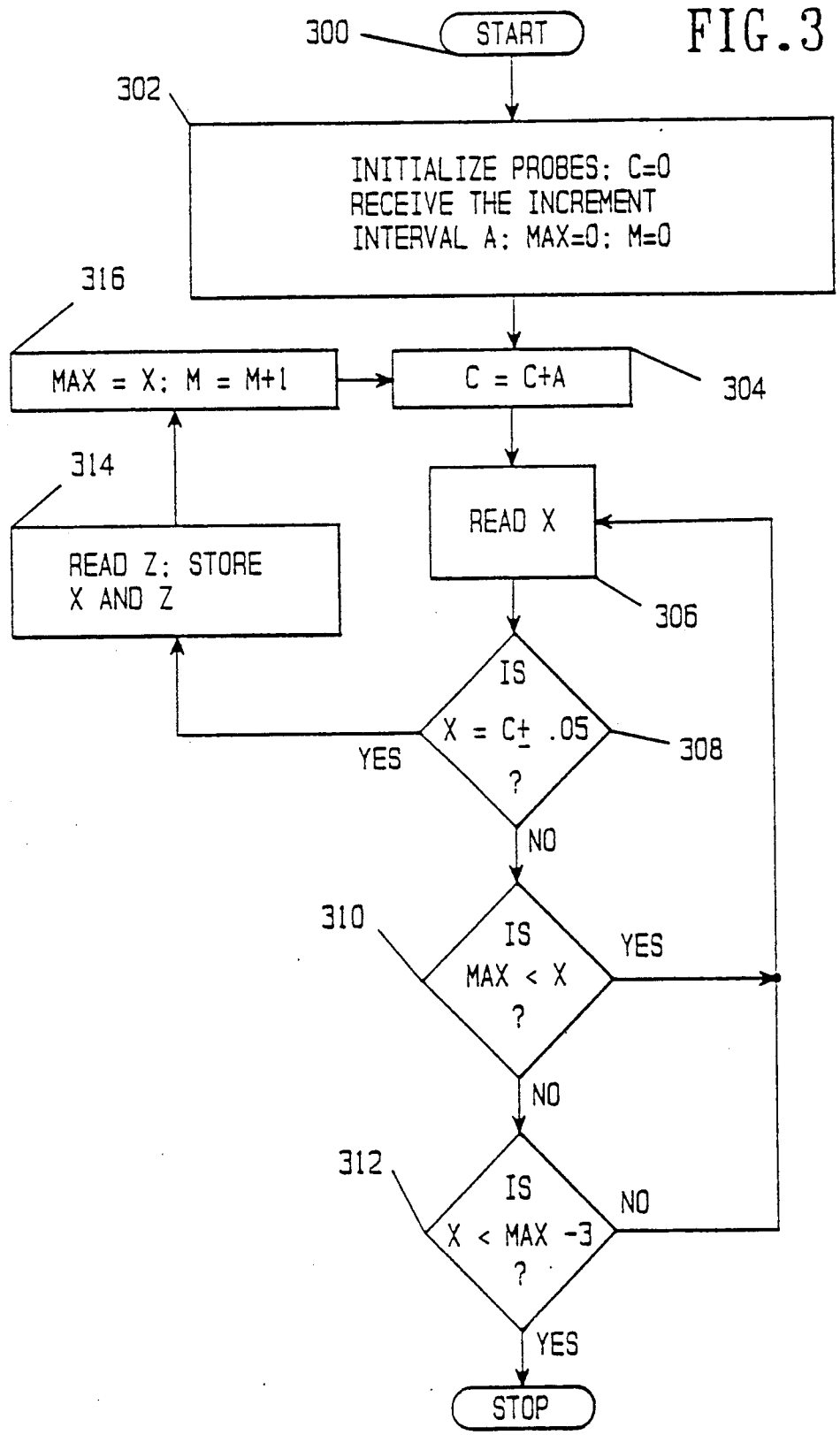
FIG. 3 is a decision flow diagram illustrating the method by which the surface is gauged to provide a plurality of data samples.

In operation, the plurality of samples are provided by using the sensing unit 100 to gauge the surface 102. The user moves the carriage assembly 116 to the starting position and provides an instruction to the microprocessor 108, via the user interface 106, to initialize the system. The sensing unit 100 is initialized by initializing the probes 142 and 144, step 302 (FIG. 3). The microprocessor 108 receives an increment interval value A, which may either be retrieved from the memory 110 or provided by a user via the user interface 112. A number of indexes which are used by the program of the microprocessor 108 are initialized at zero.

The user slowly moves the carriage assembly along the guide bars 118 and 120. The microprocessor increments the index c by the increment interval A, step 304, and monitors the X data values from the sensor 144, steps 306-312. The monitoring requires the microprocessor 108 to receive an X value, step 306, and compare the received X value to an error window, step 308. If the X value is not within the window range, then the microprocessor determines whether the carriage assembly is moving forward by comparing the received X value to the maximum received X value, step 310. If the maximum received X value is less than the received X value, then the microprocessor 108 determines whether the X value is a predetermined distance from the maximum, step 312, and if so, terminates the measurement. In this manner, a user can terminate the measurement by moving the carriage assembly backwards a distance which exceeds the predetermined distance of step 312.

If the carriage assembly has not been moved backwards beyond the predetermined distance, step 312, or if the maximum received X is less than the received X, step 310, then the microprocessor 108 continues to read X values until the carriage assembly 116 has been moved forward a distance equal to the increment interval plus or minus the window, steps 304-312. When the carriage assembly 116 has been moved forward a distance equal to the increment interval A, step 308, then the microprocessor 108 reads the Z value from the sensor 142 and stores both the X and Z values, step 314. The values for the maximum X received and an index m which indicates the total number of samples taken are incremented, step 316, and the process is continued until it is terminated by the user as described above.

Figure 4:
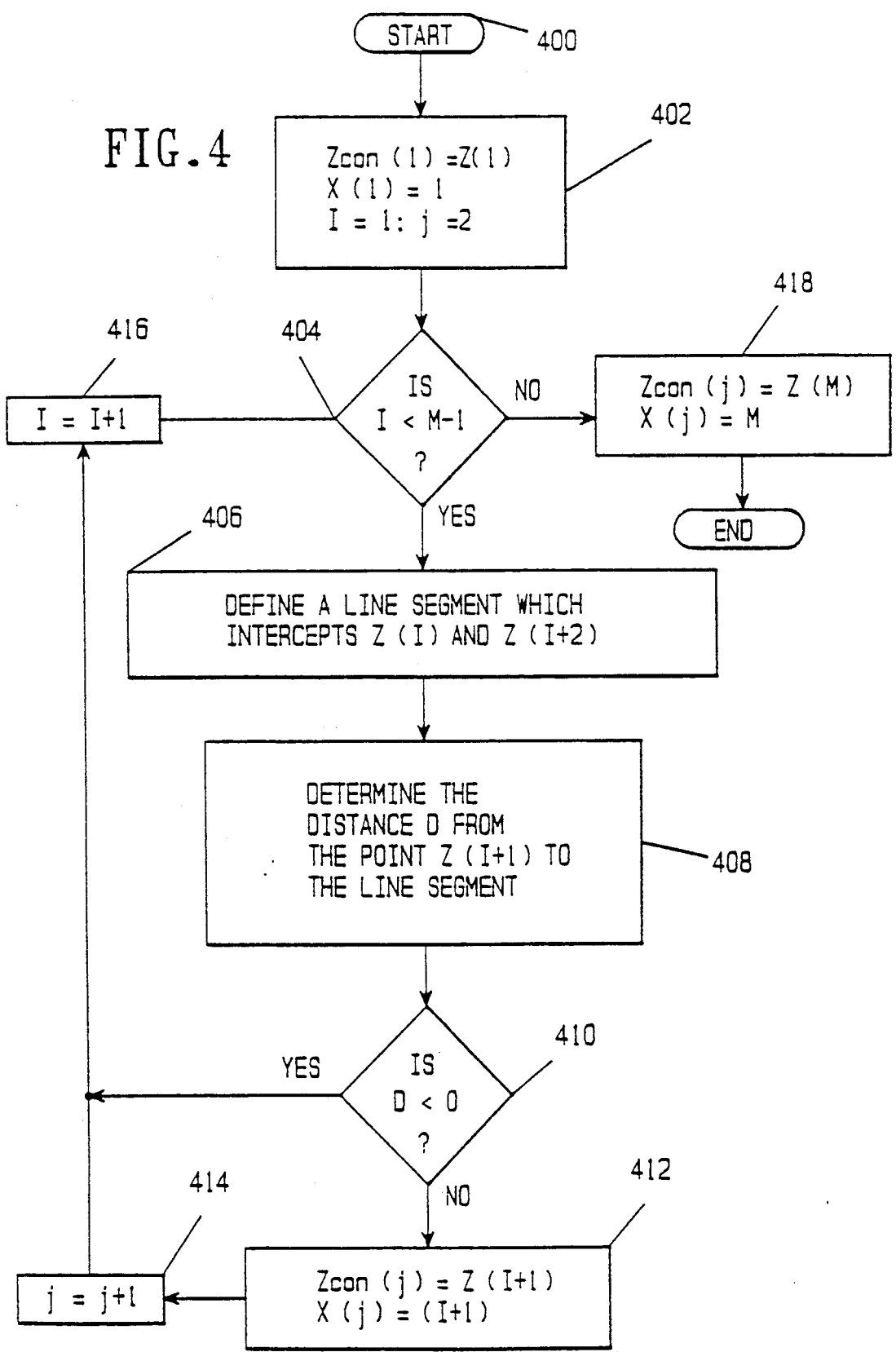
FIG. 4 is a decision flow diagram illustrating the method for determining which of the plurality of data samples are convex data points.

After the data samples have been received and recorded, step 202 (FIG. 2), the microprocessor 108 begins to process the plurality of data points to perform the waviness calculation. The microprocessor 108 first determines which of the plurality of data points are convex data points, step 204. To determine which of the plurality of data points are convex data points, the microprocessor 108 identifies the first data point Z(1) as the first convex data point $Z_{con}(1)$ and initializes several index values, step 402 (FIG. 4). The index variable I is used to indicate which of the plurality of data points was last considered and, hence, is initialized at 1 (because the first data point has been considered and identified as a convex data point). The index variable j is used to indicate the number of convex data points identified and is initialized at 2 because the first data point is identified as a convex data point, as has been discussed, and the last data point will be identified as a convex data point, as will be discussed.

The index variable I is compared to the total number of data points m to determine if each of the data points, excluding the first and last data points, has been tested, step 404. If the result of step 404 is no, the microprocessor 108 defines a line segment which intersects the two data points Z(I) and Z(I+2) which are adjacent the data point being tested Z(I+1), step 406. The line may be conveniently defined knowing only two points by determining its slope and y intercept. The microprocessor then determines the distance from the point being considered Z(I+1) to the line, step 408, and thereafter determines whether the distance is negative, step 410. If the distance is not negative, then the point being considered has a convex curvature with respect to the two data points to which it is adjacent and is therefore identified as a convex data point, step 412. Both the Z value and the X position of the identified convex data point are stored for later use by the microprocessor 108. The index value j is incremented, step 414, to indicate that another convex data point has been identified and the index value I is incremented, step 416, such that the next data point may be considered.

If the distance from the point being considered Z(I+1) to the line is negative, step 410, then the index value I is incremented so that the next data point may be considered, step 416. When the number of data points which have been considered is one less than the total number of data points m, step 404, the last data point is recorded, step 418, and the routine terminated. It will be apparent to those skilled in the art that the value of the index variable j will indicate the total number of convex data points which have been identified.

When the plurality of convex data points have been identified, step 204, the microprocessor 108 identifies a plurality of waves by defining a plurality of line segments $T_{tan}$ which are tangent to the surface 102, step 206. In defining the plurality of tangent line segments $T_{tan}$, the microprocessor first initializes a plurality of index variables, step 502. The index variables s and r are used to index the convex data points which are being considered and are initialized to the first and last data points s=1 and r=j, respectively. The variable r' is used to identify the end point of the last tangent line identified and is therefore initialized to a value outside the range of convex data points, i.e., r=m+1. The index variable Il is used to index the data points intermediate the convex data points $Z_{con}(s)$ and $Z_{con}(r)$ which are being considered and is therefore initialized to the data point adjacent the last convex data point ,i.e., Il=[X(j)−1].

Generally, the method identifies tangent lines by defining a line segment between various pairs of convex data points and determining whether any data point intermediate the end points of the line segment is above the line segment. If no data points intermediate the end points of the line segment are above the line segment, then the line segment is considered a tangent line segment. Particularly, the method starts from the rightmost and leftmost convex data points and works inward. Accordingly, for purposes of description the convex data point $X_{con}(s)$ will be described as the left endpoint and the convex data point $X_{con}(r)$ will be described as the right convex data point.

The microprocessor 108 defines a line segment $T_{temp}$ which intercepts the two convex data points $Z_{con}(s)$ and $Z_{con}(r)$ being considered, step 504. The microprocessor 108 then determines the distance from the point Z(Il) to the line segment $T_{temp}$, step 506, and determines whether the distance is less than zero, step 508. If the distance is less than zero, i.e., the point Z(Il) is below the line segment $T_{temp}$, then the microprocessor 108 chooses the next point Il, step 510, and determines whether all of the data points intermediate the end points $Z_{con}(s)$ and $Z_{con}(r)$ have been tested by determining whether the data point being tested Il is within one data point of the left end point $Z_{con}(s)$, step 512. If each data point has been tested, and no data point was above the line segment $T_{temp}$, step 508, then the line segment is identified as a tangent line segment, step 514, the right end point of the tangent line segment is recorded r'=r, also step 514, and the wave is characterized, step 516. If all of the data points intermediate the end points $Z_{con}(s)$ and $Z_{con}(r)$ have not been tested, step 512, then the microprocessor 108 continues to test points until either a tangent line segment is identified, step 514, or a point is found which is above the line segment $T_{temp}$, step 508.

After a wave has been characterized, step 516, the microprocessor must determine whether any other convex data points can be combined with the left end point X(s) to form a tangent line. In accordance with a particularly novel aspect of the invention, the microprocessor 108 determines that any convex data points which are adjacent to the right tangent end point X(r) cannot be combined with the right end point X(s) to form a tangent line. The microprocessor 108 therefore selects the next convex data point by decrementing r, step 519, and determines whether the selected convex data point is adjacent the last found tangent end point X(r'), step 520.

If so, the microprocessor 108 considers the adjacent convex data point as the last found convex data point, i.e., r'=r, step 521, selects a new convex data point, step 519, and continues to check convex data points for adjacency until a non-adjacent convex data point is found, steps 519-521.

After the new convex data point has been selected, steps 519-521, the selected data point is compared to the left end point X(s), step 522, to determine if they are adjacent. Similarly, when a point is found which is above the line segment $T_{temp}$, step 508, i.e., the line segment is not identified as a tangent line segment, a new convex data point is selected, step 518, and the new convex data point is compared with the left end point X(s), step 522, as above.

If the the convex data point X(r) is not adjacent the convex data point X(s), step 522, the microprocessor 108 sets a new range for the data points intermediate the convex data points being considered by resetting Il=X(r)-l, step 524, and defines another line segment $T_{temp}$ using the new end points X(s) and X(r), step 504. If the new convex data point X(r) is adjacent the convex data point X(s), step 522, then the left end point is moved to the right by incrementing the value of s and the right end point is moved back to the last convex data point by setting r=j, step 526.

The microprocessor then determines whether the left end point is adjacent the right end point (now the last convex data point), step 530, and, if so, all combinations of the convex data points have been tested to find all tangent line segments. If not, the microprocessor defines a new range for point intermediate the end points, step 524, and defines a new line segment, step 504.

It will be appreciated by those skilled in the art that the subject method actually identifies only those tangent line segments which do not intersect the surface. However, it may be desirable in some applications to identify all tangent line segments, whether or not they intersect the surface. In light of the above teaching, it will be apparent to those skilled in the art that this may be accomplished by only comparing the distance between those convex data points which are members of the set of adjacent convex data points of which the end points X(s) and X(r) are members. Sets of adjacent convex data points may be identified as in steps 519-521 above.

To determine the waviness characteristic of the identified waves, step 208, the microprocessor 108 defines a plurality of depth lines from each data point intermediate the end points X(s) and X(r) of the subject tangent line segment to the tangent line segment such that the depth lines are each perpendicular to the tangent line segment. The depth line which has the maximum length determines the depth of the wave. The depth of the wave is then used with the length of the wave, i.e., the length of the tangent line segment, to characterize the wave in accordance with a predetermined waviness calculation.

To define the waviness as described briefly above, the microprocessor initializes a plurality of variables: $D_{max}$ is initialized to zero and is used to indicate the length of the longest depth line found; $D_{temp}$ is also initialized to zero and is used to indicate the length of the last depth line defined; I is used to index the plurality of data points intermediate the end points and is initialized to X(s)+1, step 602. The microprocessor 108 defines the depth of the line from the first point intermediate the end points X(s) and X(r) perpendicular to the tangent line segment using a predetermined formula, step 604. Like the formula for defining a line, those skilled in the art will be able to readily provide a suitable formula for finding the length of a first line which extends from a point to intersect a second line at a right angle.

The length of the new depth line $D_{temp}$ is compared with the length of the longest depth line found, step 606, and, if the length of the new depth line is greater than the length of the longest depth line found, the length of the new depth line is considered the length of the longest depth line found, i.e., $D_{max} = D_{temp}$, step 608, and a new point is selected for consideration, step 610. The microprocessor 108 determines whether all data points intermediate the end points have been considered by determining whether the new data point is adjacent the right end point $X(r)$, step 612, and, if not, the microprocessor 108 continues to select data points, define the length of new depth lines $D_{temp}$ and compare the new length to the longest length found, steps 604-612.

When each of the data points intermediate the end points $X(s)$ and $X(r)$ have been considered, step 612, the microprocessor determines whether the wave is within predetermined tolerances using a predetermined tolerance calculation, step 614. In the presently preferred embodiment, the calculation is $[(D_{max}/L^2)(0.001)]$, wherein L is the length of the wave, i.e. the length of the tangent line segment which defines the wave. The characteristics of the wave are then recorded and reported, step 616. The characteristics which may be useful may be the depth of the wave $D_{max}$, the length of the wave, the end points (position) of the wave and the tolerance calculation for the wave. The recording may be to the memory 110 or, alternatively, the data may be recorded in an external memory device which comprises a portion of the user interface, e.g., printed recording or floppy disk. The reporting may be by other means of the user interface, e.g., graphical display.

Figure 5:
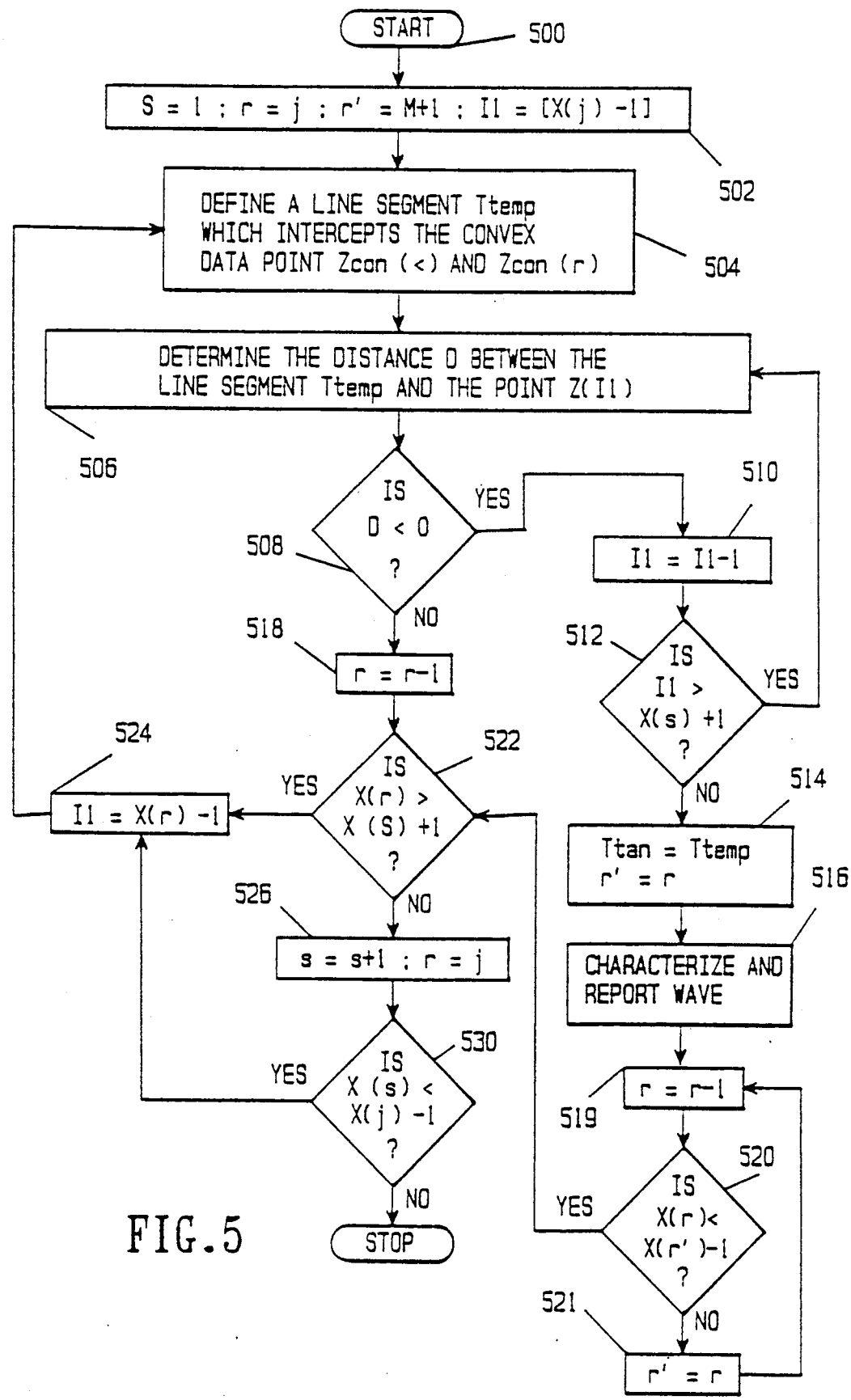
FIG. 5 is a decision flow diagram illustrating the method for identifying the waves of the surface from the plurality of data samples.
Figure 6:
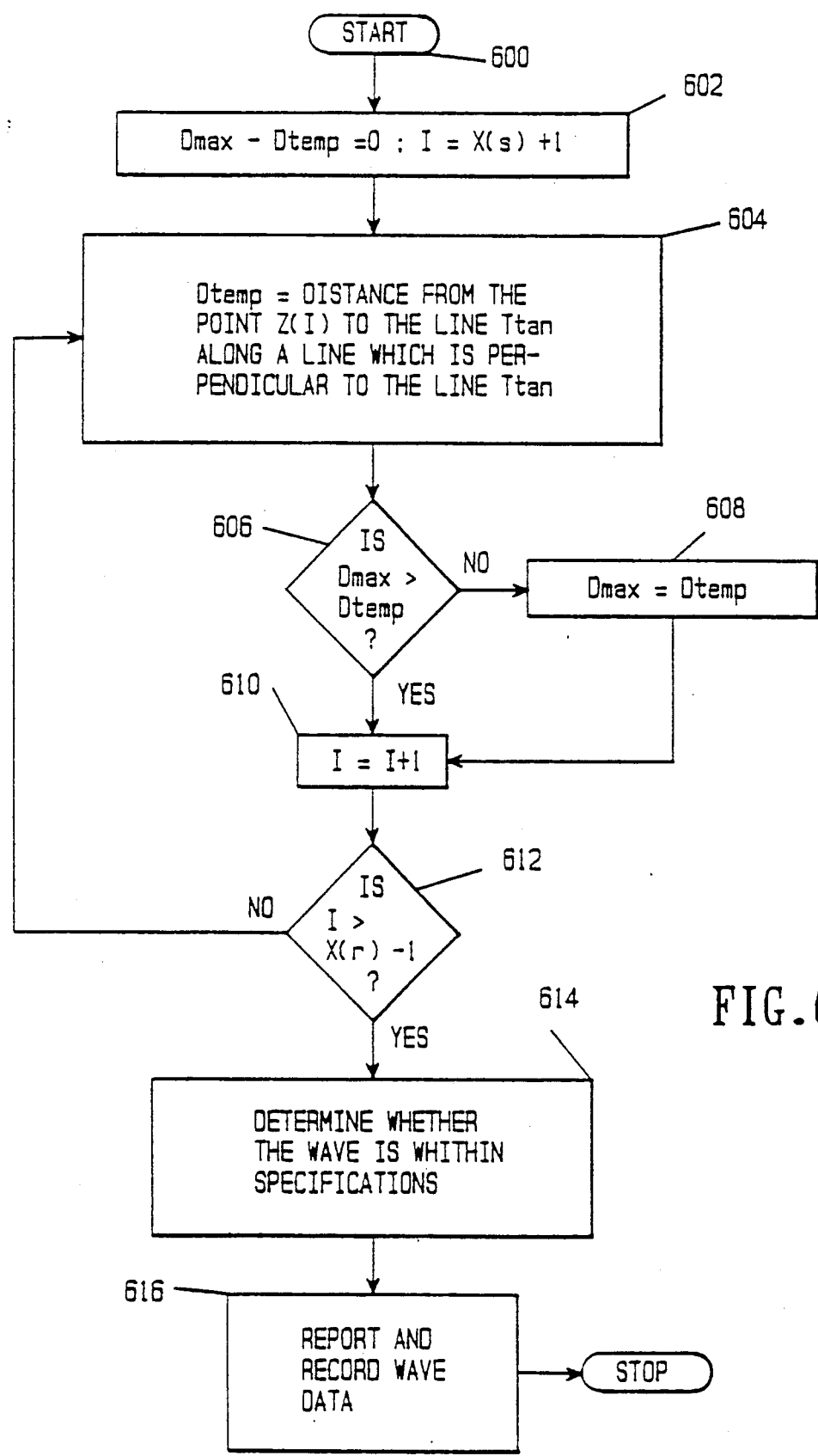
FIG. 6 is a decision flow diagram illustrating the method of the present invention for characterizing the waves in accordance with a predetermined waviness calculation.

It will be apparent to those skilled in the art that although the recording and reporting of waves has been described as an integral portion of identifying tangent line segments in steps 206-212 of FIG. 2 and FIGS. 5 and 6, the reporting and recording may be performed after each tangent line segment has been identified and its parameters stored. Similarly, the waviness calculations may all be performed before the any wave is reported or recorded.

It will also be apparent to those skilled in the art that the many variables which have been described herein, including the predetermined waviness calculation, may be easily provided, or updated, using the user interface 106. Further, it will be apparent that although the invention is described and claimed herein with positive distance increasing outward from the surface, the invention could be practiced changing the sense of the positive direction or changing the formulas for measuring distances may be changed and tests made for negative distances.

Further, it will be apparent that the tangent lines referred to herein may not be absolutely tangent to the surface, but represent the best possible approximation.

Although the invention has been illustrated and described herein by reference to several presently preferred embodiments thereof, it will be apparent to those skilled in the art that many modifications and variations of the present invention may be made without departing from the true scope and spirit of the invention. Accordingly, the invention should not be limited to the several embodiments shown and described above but should only be limited by the appended claims which follow.

We claim:
1. A method for determining the waviness of an aerodynamic surface comprising the steps of:
   (a) sampling the surface at a plurality of data points m along the aerodynamic flow path of the surface wherein each data point indicates the vertical deflection Z of the surface at the position X where the data point was taken and storing the plurality of data points as data points $Z(m)$;
   (b) identifying the first and last points $Z(1)$ and $Z(m)$, respectively, as convex data points $Z_{con}(1)$ and $Z_{con}(m)$, wherein m equals the total number of data points and setting j=2;
   (c) determining whether a selected data point $Z(n)$ is vertically above a line which passes between two points $Z(n-1)$ and $Z(n+1)$ which are adjacent to the selected point $Z(n)$ and, if so, identifying the selected point as a convex data point $Z_{con}(j) = Z(n)$, wherein j equals the number of convex data points, and incrementing j;
   (d) repeating step (c) for each data point except the first data point $Z(1)$ and the last data point $Z(m)$ and setting $Z_{con}(j+1) = Z_{con}(m)$ to determine the set of convex data points $Z_{con}$ so that j+i equals the number of convex data points in the set;
   (e) defining two index values s and r to index the first and last convex data points $Z_{con}(s)$ and $Z_{con}(r)$, respectively, wherein s=1 to index the first convex data point and r=j+1 to index the last convex data point;
   (f) defining a line segment $T_{temp}$ which passes between the points $Z_{con}(s)$ and $Z_{con}(r)$ such that the points $Z_{con}(s)$ and $Z_{con}(r)$ are the end points of the line segment;
   (g) determining whether the line segment $T_{temp}$ is vertically above each data point $Z(n)$ intermediate the end points $Z_{con}(s)$ and $Z_{con}(r)$ and, if so, identifying the line segment as a tangent line segment $T_{tan} = T_{temp}$ and the end points as first and second tangent end points $Z_{tan}(1) = Z_{con}(s)$ and $Z_{tan}(2) = Z_{con}(r)$ of a wave and performing step (h) and, if not, decrementing the index variable r to select another convex data point $Z_{con}(r)$ and performing step (k);
   (h) defining a plurality of depth lines from each data point $Z(n)$ intermediate the end points $Z_{tan}(1)$ and $Z_{tan}(2)$ to a point along the tangent line segment $T_{tan}$ such that each depth line is normal to the line segment $T_{tan}$, determining which depth line has the maximum length $D_{max}$ and performing step (i);
   (i) determining the waviness characteristics of the wave intermediate the end points $Z_{con}(s)$ and $Z_{con}(r)$ using the formula waviness = $(D_{max}/L^2)(0.001)$, wherein L is equal to the length of the line segment $T_{tan}$, reporting the waviness characteristics of the wave and performing step (j);
   (j) decrementing the index value r by one r=r-1 to find the next convex data point $Z_{con}(r)$, determining whether the convex data point $Z_{con}(r)$ is the data point $Z(r)$ adjacent the tangent end point $Z_{tan}(2)$ and, if so, considering the tangent end point to be the convex data point $Z_{tan}(2) = Z_{con}(r)$ and repeating step (j) and, if not, performing step (k);
   (k) determining whether the convex data point $Z_{con}(r)$ is the data point $Z(r)$ adjacent the convex data point $Z_{con}(s)$ and, if not, performing step (f) and, if so, performing step (l); and (l) incrementing the index value s by one s=s+1 to find the next convex data point $Z_{con}(s)$, indexing the value r to the last convex data point r=j+1 and determining whether the convex data point $Z_{con}(s)$ is the data point Z(r) adjacent the last convex data point $Z_{con}(r)$ and, if not, performing step (f) and, if so, terminating the method.

2. A method for measuring the waviness of a surface by determining the characteristics of waves in the surface, said method comprising the steps of:

(a) gauging the surface at a plurality of m points taken at a plurality of horizontal positions X along the surface to provide a plurality of data points Z(n) wherein each point indicates the vertical deflection Z of the surface at the horizontal position X where the data point was taken and storing the plurality of data points;

(b) defining a set of convex data points $Z_{con}$ along the surface wherein a subject data point is defined as a convex data point if it is horizontally above the two points which are adjacent the subject data point;

(c) defining subject line segment as a line segment which intercepts two subject convex data points determining whether a plurality of selected data points are above the subject line segment and, if not, identifying the subject line segment as a tangent line segment wherein the end points of the tangent line segments are the points of tangency of a line that is tangent to the surface on at least two points displaced from one another and wherein the waves are defined by the surface intermediate the end points of the tangent line segments; and (d) repeating step (c) until a plurality of tangent line segments have been identified; and (e) determining the waviness characteristics of the plurality of identified waves in accordance with a predetermined waviness calculation.

3. The method as recited in claim 2 further comprising the step of recording the waviness characteristics of the plurality of waves for later analysis or display.

4. The method as recited in claim 2 wherein the plurality of selected data points are chosen as the set of convex data points adjacent the intermediate the subject convex data points.

5. The method as recited in claim 4 wherein step (c), defining a subject line segment as a line segment which intercepts two subject convex data points, determining whether selected data points are above the subject line segment, comprises the substep of:

(l) selecting two sets of convex data points wherein each member of each set is adjacent another convex data point of that set;

(m) selecting two convex data points $Z_{con}(s)$ and $Z_{con}(r)$ of the two subject sets of the adjacent convex data points which are displaced by the maximum distance as the starting points, wherein $Z_{con}(s)$ is a member of the first set of adjacent convex data points, $Z_{con}(r)$ is a member of the second set of adjacent convex data points and r>s;

(n) defining a subject line segment as the line segment which intercepts the two convex data points $Z_{con}(s)$ and $Z_{con}(r)$;

(o) determining whether any of the convex data points of either the first or second set of adjacent convex data points is above the subject line segment and, if so, performing step (p) and, if not, identifying the subject line segment as a tangent line segment and performing step (p); and (p) repeating steps (l)-(o) until each combination of sets of adjacent convex data points has been tested.

6. The method as recited in claim 2 wherein the plurality of selected data points are chosen as the set of data points intermediate the subject convex data points.

7. The method as recited in claim 6 wherein step (d), identifying a plurality of waves along the surface, comprises the substeps of:

(m) selecting the two convex data points $Z_{con}(s)$ and $Z_{con}(r)$ which are displaced by the maximum distance as the starting points; (n) defining a subject line segment as the line segment which intercepts the two convex data points $Z_{con}(s)$ and $Z_{con}(r)$;

(o) determining whether any of the data points intermediate the two convex data points $Z_{con}(s)$ and $Z_{con}(r)$ are above the subject line segment and, if so, performing step (p) and, if not, identifying the subject line segment as a tangent line segment nd performing step (p); and (p) repeating steps (l)-(o) until each combination of convex data points have been tested.

8. The method as recited in claim 7 wherein step (b), identifying the set of convex data points comprises the substeps of:

(r) determining whether the distance from a selected point Z(n) and a line which passes between the two points that are adjacent to the selected point Z(n−1) and Z(n+1) is positive and, if so, identifying the selected point as a convex data point $Z_{con}(j)=Z(n)$ wherein j equal the number of identified convex data points; and (s) repeating step (r) for each data point except the first data point Z(l) and the last data point Z(m).

9. The method as recited in claim 8 wherein step (b), identifying the set of convex data points further comprises the step of identifying the first and last data points Z(l) and Z(m) as convex data points $Z_{con}(l)=Z(l)$ and $Z_{con}(j)=Z(m)$.

10. The method as recited in claim 9 further comprising the step of recording the waviness characteristics of the plurality of waves for later analysis or display.

11. The method as recited in claim 8 wherein step (e), determining the waviness characteristics of the plurality of identified waves, comprises the subsets of:

(t) defining a plurality of lines from each data point Z(n) intermediate the end points of the tangent line segment which defines the wave to the tangent line segment such that the plurality of lines are each normal to the tangent line segment and determining which line of the plurality of lines has the maximum length $D_{max}$; and (u) determine the waviness characteristics of the wave using the formula waviness=$(D_{max}/L^2)(0.001)$, wherein L is equal to the length of the tangent line segment which defines the wave.

12. The method as recited in claim 7 wherein step (e), determining the waviness characteristics of the plurality of identified waves, comprises the substeps of;

(t) defining a plurality of depth lines from each data point Z(n) intermediate the end points of the tangent line segment such that the depth line is normal to the line segment, and determining which depth line has the maximum length $D_{max}$; and (u) determining the waviness characteristics of the wave intermediate the end points of the tangent line segment using the formula waviness=(D-

$_{max}/L^2)(0.001)$, wherein L is equal to the length of the tangent line segment.

13. The method as recited in claim 2 wherein step (b), identifying the set of convex data points comprises the substeps of:

(j) determining whether a selected point $Z(n)$ is horizontally above a line which passes between the two points $Z(n-1)$ and $Z(n+1)$ that are adjacent to the selected point $Z(n)$ and, if so, identifying the selected point as a convex data point $Z_{con}(j)=(n)$ wherein $j+1$ equals the number of identified convex data points; and (k) repeating step (j) for each data point except the first data point $Z(l)$ and the last data point $Z(m)$.

14. The method as recited in claim 13 wherein step (b), identifying the set of convex data points further comprises the step of identifying the first and last data points $Z(l)$ and $Z(m)$ as convex data points $Z_{con}(l)=Z(l)$ and $Z_{con}j+1)=Z(m)$ so that $j+1$ equal the number of convex data points.

15. The method as recited in claim 2 wherein step (e), determining the waviness characteristics of the plurality of identified waves, comprises the substeps of:

(t) defining a plurality of lines from each data point $Z(n)$ intermediate the end points of the tangent line segment which defines the wave to the tangent line segment such that the plurality of lines re each normal to the tangent line segment and determining which line of the plurality of lines has the maximum length $D_{max}$; and (u) determining the waviness characteristics of the wave using the formula waviness = $(D_{max}L^2)(0.001)$, wherein L is equal to the length of the tangent line segment which defines the wave.

16. Apparatus for measuring the waviness of an aerodynamic surface comprising:

sensor means for providing a plurality of data points at predetermined horizontal intervals wherein each data point represents the vertical deflection Z of the surface at the horizontal position where the data point was taken $Z(n)$;

memory means for storing the plurality of data points such that each point can be identified with the horizontal position at which the point was taken; and data processing means for processing the plurality of data points to identify each wave of the surface and thereafter to determine the waviness characteristics of the wave, said data processing means including means for defining tangent line segments by identifying each convex data point along the surface, identifying a plurality of adjacent convex data point sets wherein each set includes the set of convex data points which are also adjacent data points, defining a subject line segment as a line segment which intercepts two subject convex data points that are members of two subject sets of adjacent convex data points, determining whether each convex data point in the two subject sets of adjacent data points is below the subject line segment and, if so, identifying the subject line segment as a tangent line segment thereby to identify each wave that is tangent to the surface, said data processing means being further configured to record waviness characteristics of the waves in said memory means.

17. Apparatus as recited in claim 16 further comprising means for providing data to said memory means from a user such that user provided data can be used for modeling surfaces and calibrating the system.

18. Apparatus as recited in claim 16 further comprising means for securing said sensor means to the surface to ensure the integrity of the waviness measurement.

* * * * *